United States Patent [19]
Breese

[11] Patent Number: 5,611,135
[45] Date of Patent: Mar. 18, 1997

[54] METHOD OF MAKING A TUBE YOKE FOR DRIVE LINE ASSEMBLY

[75] Inventor: Douglas E. Breese, Northwood, Ohio

[73] Assignee: Dana Corporation, Toledo, Ohio

[21] Appl. No.: 407,812

[22] Filed: Mar. 21, 1995

[51] Int. Cl.⁶ .......................... B22D 11/128; F16D 3/26; F16D 3/40
[52] U.S. Cl. .................. 29/527.6; 29/896.7; 228/173.4; 403/57; 403/157; 464/134; 464/183
[58] Field of Search ............................... 29/527.6, 896.7, 29/525, 526.4, DIG. 5, DIG. 18; 164/457, 460, 69.1; 403/57, 157; 464/133, 134, 180, 182, 183; 228/154, 173.4; 72/372; 138/109

[56] References Cited

U.S. PATENT DOCUMENTS

| | | | |
|---|---|---|---|
| 2,291,420 | 8/1942 | Swenson | 228/173.4 X |
| 2,577,692 | 12/1951 | Slaght | 403/57 X |
| 4,161,273 | 7/1979 | Jeffers | 228/154 |
| 4,192,153 | 3/1980 | Fisher | 403/157 X |
| 4,307,833 | 12/1981 | Barnard | 29/525 X |
| 4,348,874 | 9/1982 | Muller et al. | 464/182 X |
| 4,358,284 | 11/1982 | Federmann et al. | 464/183 X |
| 4,380,443 | 4/1983 | Federmann et al. | 464/183 X |
| 4,421,497 | 12/1983 | Federmann et al. | 464/183 X |
| 4,575,361 | 3/1986 | Thatcher | 29/527.6 X |
| 4,583,960 | 4/1986 | Joyner | 464/134 |
| 4,646,552 | 3/1987 | Kanbe | 29/896.7 X |
| 4,663,819 | 5/1987 | Traylor | 29/525 X |
| 4,881,924 | 11/1989 | Gall | 403/57 X |
| 4,952,195 | 8/1990 | Traylor | 464/183 X |
| 5,076,344 | 12/1991 | Fields et al. | 164/457 |
| 5,078,533 | 1/1992 | Madonio et al. | 464/133 X |
| 5,234,378 | 8/1993 | Helgesen et al. | 464/180 |
| 5,342,243 | 8/1994 | Seksaria et al. | 464/134 |

Primary Examiner—Peter Vo
Attorney, Agent, or Firm—MacMillan, Sobanski & Todd

[57] ABSTRACT

A method of making a tube yoke for a drive line assembly is provided. The tube yoke is a unitary element and has a tube seat at one end for mating with a driveshaft tube, and lug ears at the other end for connecting with a universal joint assembly. The method includes forging a body of metal into a net shape body of the tube yoke with a single die-punching stroke, and subjecting the tube seat of the net shape body to a draw and iron operation to form the tube seat into its final pre-assembly form and shape, having a tube seat at one end and lug ears at the other end without machining of the tube seat. The lug ears are machined to enable connection with the universal joint assembly.

20 Claims, 3 Drawing Sheets

METHOD OF MAKING A TUBE YOKE FOR DRIVE LINE ASSEMBLY

BACKGROUND OF THE INVENTION

This invention relates in general to drive line assemblies suitable for transferring power in a vehicle, and in particular to an improved drive line apparatus for transferring torque from a rotating tubular driveshaft to a universal joint assembly.

Metallic torque transmitting shafts and similar components are widely used for many different applications. In particular, metal torque transmitting shafts are frequently used in vehicular drive trains including axle shafts, yoke shafts and the like. In use, these shafts can be subjected to relatively large torque loads imposed on them by the vehicle engine to move the vehicle. It is desirable for these torque-beating members to be as strong as possible while still being light weight. Typically, driveshaft members are hollow to provide the maximum strength for the weight involved. It is known that driveshafts must be rotated at speeds below their critical speed to avoid resonance which leads to self destruction. The critical speed for any given driveshaft is a function of the density, modulus and geometry of the material in the driveshaft. Generally, the smaller the driveshaft diameter, the lower the critical speed of the driveshaft. Therefore it is desirable for the driveshaft to be at least as large in diameter as a specified minimum size for a particular driveshaft length and composition of material.

Vehicle driveshafts usually are adapted with universal joint assemblies for connection to other rotating drive line elements. The universal joints help accommodate differences in angular alignment between two rotating elements, such as a transmission output shaft and a driveshaft tube. Universal joints further enable a small amount of relative movement between the driveshaft and an adjacent rotating part, such as a transmission output shaft or an axle assembly input shaft. In a typical vehicle driveline assembly, the driveshaft tube is connected at each of its ends to a tube yoke which connects to a universal joint assembly. The universal joint assembly usually consists a journal cross and four bearing assemblies. Typically, assembly involves securing the cross member into place with a bearing strap and a plurality of lug bolts. An important requirement for the assembly of the driveline apparatus is gaining access to various driveline elements for the insertion of tools necessary to complete the assembly. In particular, it is important to be able to reach the lug bolts during the assembly of the universal joint. Power tooling is used, and the tooling must be accurately aligned to obtain the proper torque on the lug bolts.

Past attempts to lower the weight of vehicle driveshafts have resulted in replacing traditional two-piece steel driveshafts with lighter weight one-piece aluminum alloy driveshafts. This reduces the driveshaft weight, but, because it is longer, requires a larger diameter driveshaft for the same critical speed. The critical speed of the driveshaft can be increased by covering the driveshaft with a high strength coating, such as a resin matrix reinforced with graphite fibers, but this increases the manufacturing cost. It would be advantageous if there could be developed a driveline assembly which would enable the substitution of lighter weight aluminum alloys for the traditional steel tubes, and yet not require the use of expensive reinforcing coatings. Any solution to the problem would have to include the requisite access for the tooling needed to assemble the universal joints at the ends of the driveline tube.

Another problem associated with drive line assemblies is the cost of manufacturing various parts making up the drive line assembly. Elements of the universal joint, for example, usually are costly to manufacture. Using light weight materials, such as aluminum alloys, for drive line elements still fails to significantly reduce the manufacturing costs of the driveline element. As an example, tube yokes made of aluminum alloys require forming to an initial shape and size, followed by machining the tube seat to the desired tolerances. Typically the forming to the initial shape is accomplished by casting or forging a body of metal into the general shape of the part. Elimination of the requirement for machining the tube seats would substantially reduce manufacturing costs of the tube yoke. As is well known, machining costs include the costs of the machining assets as well as maintenance costs and the labor required to operate the machines. It would be advantageous if a method could be developed for making tube yokes for drive line assemblies, where the tube seat requires no machining.

SUMMARY OF THE INVENTION

There has now been developed a method for making tube yokes for drive line assemblies where the tube seat requires no machining. The method includes forming a body of metal into a net shape body of the tube yoke, followed by subjecting the net shape body to a forming operation which forms the net shape body to the final shape of the tube yoke. The tube yoke has a tube seat at one end, and a lug structure with lug ears at the other end. The forming operation leaves the tube seat in its final pre-assembly form and shape. After the forming operation, the lug ears are machined to enable them to be connected with the universal joint assembly.

The forming operation can be carried out using any of several steps. Preferably, the net shape body is subjected to a draw and iron operation to form the tube seat into its final pre-assembly form and shape. If a draw and iron method is used, it can be set up to be done with a single die-punching stroke. Another possible forming operation to form the tube seat into its final pre-assembly form and shape is to subject the net shape body to a spinning operation. The tube seat can also be formed into its final pre-assembly form and shape by subjecting the net shape body to a burnishing operation.

The method of the invention is preferably carried out using an aluminum alloy as the metal. The step of forming the body of metal into the net shape body is preferably accomplished by a forging process, although casting or other processes could also be used. The tube yoke is preferably a unitary element, being of one piece, not welded, threaded or bolted together. The method of the invention also includes aging the metal to a T-6 temper. Ideally, the metal is aged from a T-4 temper to a T-6 temper prior to forming the net shape body into the final shape of the tube yoke.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
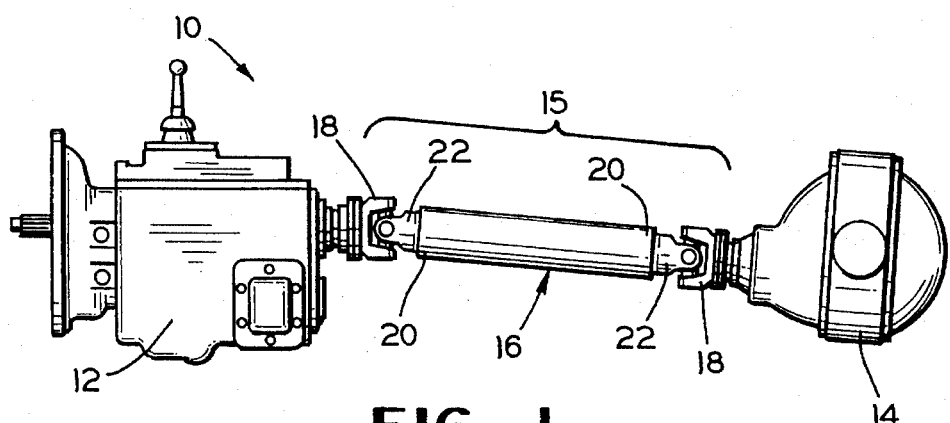
FIG. 1 is a schematic view in elevation of a drive train incorporating the drive line assembly of the invention.

As shown in FIG. 1, the drive train, indicated generally at 10, is comprised of transmission 12 connected to axle assembly 14 through drive line assembly 15. The drive line assembly includes a cylindrically shaped driveshaft or driveshaft tube 16. The driveshaft can be of any suitable material, but is preferably hollow and metallic, most preferably of a lightweight aluminum alloy such as a 6061 alloy. As is typical in vehicle drive trains, the transmission output shaft, not shown, and the axle assembly input shaft, not shown, are not coaxially aligned. Therefore, universal joints 18 are positioned at each end 20 of the driveshaft to rotatably connect the driveshaft to the transmission output and the axle assembly input. The connection between the ends 20 of the driveshaft and the universal joints is accomplished by tube yokes 22. The drive train apparatus described thus far is generally conventional, and is well known in the industry.

Figure 2:
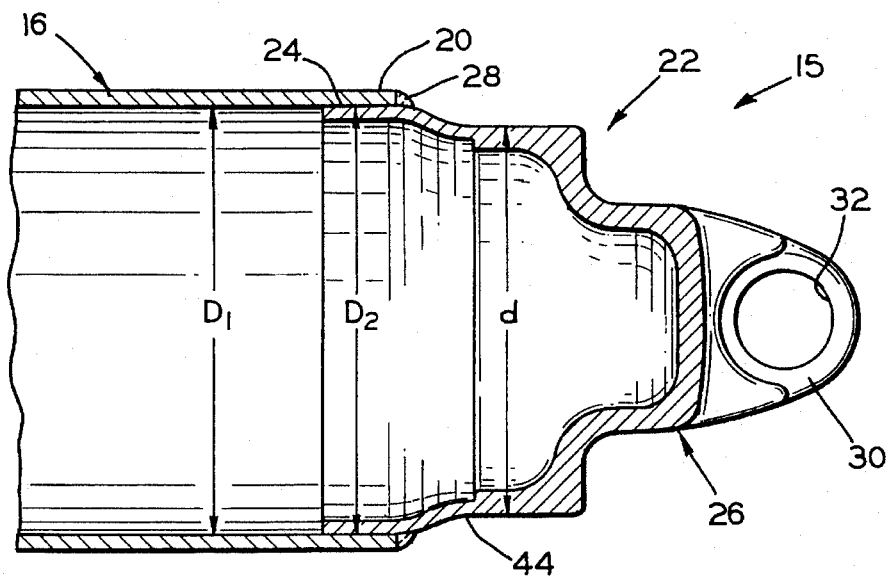
FIG. 2 is a schematic plan view, partially in cross-section, of a drive shaft and tube yoke in accordance with this invention.

As shown more clearly in FIG. 2, the tube yoke 22 is comprised of the tube seat 24 at one end, and the lug structure 26 at the other end. The tube yoke can be made of any suitable material, and is preferably metallic, being of aluminum or an aluminum alloy.

The tube seat is adapted to mate or fit with the end 20 of the driveshaft tube 16 to enable torque to be transmitted between the driveshaft tube and the tube seat. The torque transmitting capacity of the connection between the driveshaft tube and the tube yoke is increased by providing a weld, such as fillet weld 28. Although a fillet weld is preferred, other welds could be used.

Figure 3:
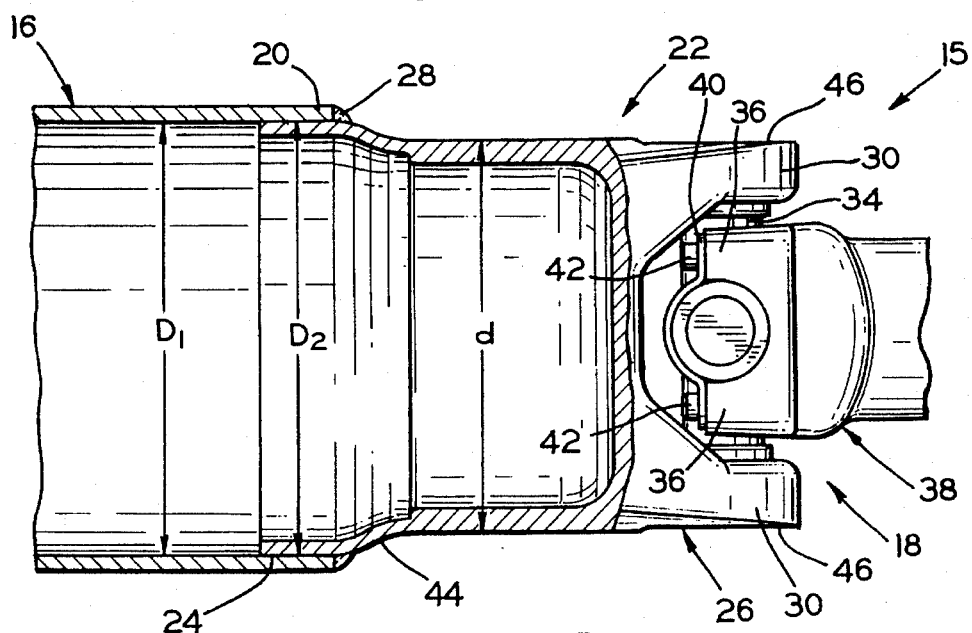
FIG. 3 is a schematic view in elevation, partially in cross-section, of the drive line assembly illustrated in FIG. 2, rotated 90 degrees from the view in FIG. 2.

The lug structure is comprised of lug ears 30 adapted with cross orifices 32 which receive the universal joint journal cross, not shown in FIG. 2, but shown as universal joint journal cross 34 in FIG. 3. The cross is connected to the end yoke lug ears 36 of the end yoke 38 to form the complete universal joint 18. The end yoke is connected to other rotatable drive train elements. The end yoke lug ears 36 can be held in place around the journal cross by any retaining device, such as by bearing strap 40, as shown in FIG. 3. The bearing strap is secured to the end yoke lug ears by lug bolts 42, which can be threaded into the end yoke lug ears. Access must be provided to the lug bolts during assembly of the drive line assembly in order to secure the bearing strap into place. The lug structure 26 transmits torque through the universal joint, to or from other rotatable drive line elements, such as the transmission 12 and the axle assembly 14.

It can be seen that the generalized diameter d of the lug structure 26 is less than the outside diameter $D_2$ of the tube seat 24. Positioned intermediate the tube seat and the lug structure is the tube yoke diameter reducing portion 44 which provides for a change in diameter of the tube yoke to accommodate both the inside diameter $D_1$ of the enlarged driveshaft tube 16 and the smaller diameter d of the lug structure. It is to be understood that the lug structure is not usually perfectly cylindrical, and therefore does not have a definitive diameter. However, the lug structure usually has oppositely spaced, generally planar or arcuate faces, such as lug faces 46, shown more clearly in FIG. 3, which can be used to provide a generalized diameter of the lug structure. In the preferred embodiment of the invention, the general diameter d of the lug structure is within the range of from about 0.60 to about 0.95 of the tube seat diameter $D_2$. Most preferably, the general diameter d of the lug structure is within the range of from about 0.80 to about 0.93 of the tube seat diameter $D_2$. In a specific embodiment of the drive line assembly 15, the driveshaft and the tube seat are about 5 inches in diameter, and the lug structure is about 4 inches in diameter. This is expected to be sufficient to enable the use of an unreinforced aluminum alloy driveshaft tube while still providing access for tooling during fabrication of the universal joint 18.

The diameter reducing portion 44 is preferably designed with a smooth curve for ease of manufacture, but could also be formed with a step-like diameter reduction. It is important that the diameter reducing portion be positioned far enough away from the lug bolts that the tooling for the lug bolts, such as power wrenches, can be inserted in place. Preferably, the diameter reducing portion is positioned at least 2¾ inches from the lug bolts.

During the fabrication of the drive line assembly 15, the tube seat 24 is inserted into the end 20 of the driveshaft tube 16. The inside diameter $D_1$ of the driveshaft is preferably sized to be slightly smaller than the outside diameter $D_2$ of the tube seat. Preferably, the driveshaft tube inside diameter $D_1$ is within the range of from about 0.980 to about 0.999 of the tube seat diameter $D_2$ prior to the insertion of the tube seat into the driveshaft tube. After the insertion of the tube seat into the driveshaft, the tube seat becomes slightly deformed since at that point the tube seat diameter $D_2$ equals the driveshaft tube inside diameter $D_1$. By making the tube seat diameter $D_2$ slightly larger than the driveshaft tube inside diameter $D_1$ prior to insertion of the tube seat into the driveshaft, the two parts will have an interference fit or press fit, which provides some torque transmitting capacity.

Figure 4:
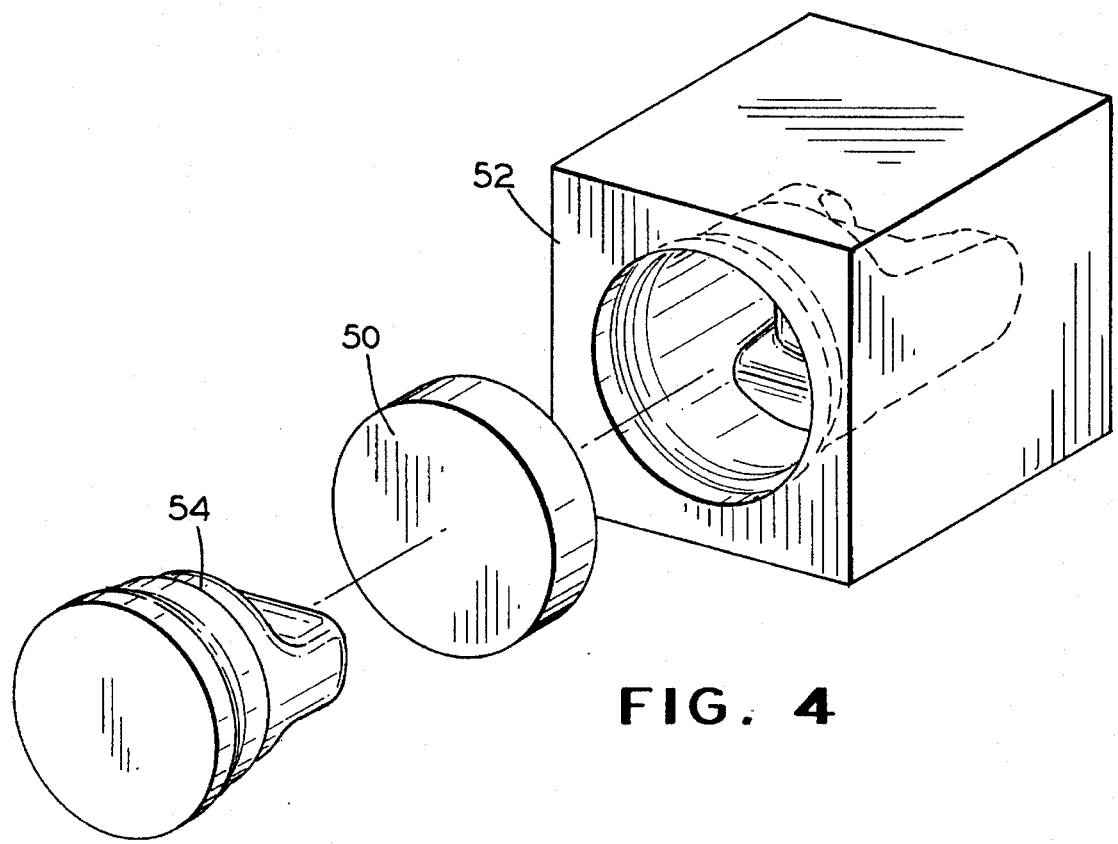
FIG. 4 is a schematic view in perspective of a forging operation for forming a body of metal into a net shape body of the tube yoke.

The manufacture of the tube yoke 22 begins with the forming of a body of metal into a net shape body of the tube. The net shape body can be made by any of several methods known in the art. One such method is casting. Another method, which is preferred, is forging. In a forging process, a body of metal, such as aluminum plug 50 shown in FIG. 4, is inserted into a female die, such as tube yoke die 52. The tube yoke die 52 is shaped to provide the outside dimensions of the tube yoke. After the aluminum plug is inserted into the tube yoke die, the tube yoke male die, such as tube yoke punch 54, is rammed into the female die 52 to forge the net shape of the tube yoke. The tube yoke punch has as its outside shape the desired inside shape of the tube yoke. Typical tolerances of such forging processes for aluminum alloys of the type used for drive line assemblies are about ±0.015–0.020 inches. After forging, the excess material or flash is removed. The operation of the forging process is generally conventional, and well known to those skilled in the art.

After the body of metal 50 is formed into a net shape body having nearly the shape desired for the final shape, the tube seat is subjected to a forming operation to form the tube seat into its final pre-assembly form and shape. This can be accomplished by several different steps. Preferably the net shape body is put through a draw and iron stamping process to set the final dimensions of the tube seat outside diameter $D_2$. By using a draw and iron process, the necessity of machining, milling or mining the tube seat is eliminated. The terms "formed element" and "forming operation" means that the element is pushed or shaped into its final pre-assembly form and shape without the loss of any material, as in a coining process, rather than being machined, turned or milled, which would involve the removal of material to obtain the final pre-assembly form and shape. Since a formed element does not require a machining process, the formed element is less costly to manufacture. Also, the tube yoke is preferably a unitary element, which means it is of one piece, and is not welded, threaded or bolted together.

Figure 5:
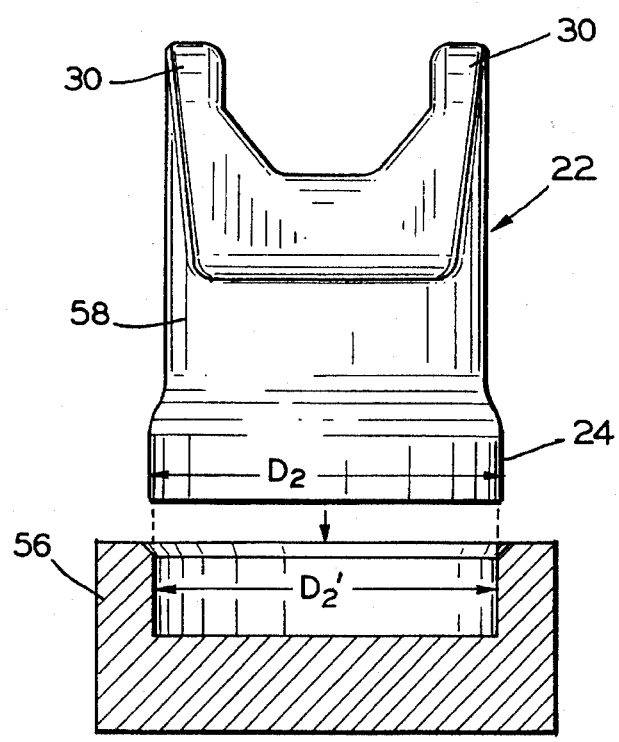
FIG. 5 is a schematic view in elevation, partially in cross section, of a draw and iron forming operation.

The draw and iron process generally involves pressing or punching a workpiece into a draw and iron die. Prior to the draw and iron process, the workpiece is already generally formed into the net shape of the final part, either by a casting or a forging process. The draw and iron die, indicated as element 56 in FIG. 5, is generally made of die steel. The tube seat of the net shape body 58 is forced into the draw and iron die to provide the final shape and dimensions for the tube seat. The draw and iron process forces the relatively soft aluminum alloy, usually with a single die stroke, into the die 56, thereby forming and smoothing the forged or cast surface of the tube seat 24 into a part having the desired dimensions, generally within a tolerance of about ±0.002 inches.

The draw and iron die 56 has an inside diameter $D_2'$ which is slightly smaller than the ultimately desired tube seat outside diameter $D_2$ of the final pre-assembly form and shape. This to allow for a slight amount of expansion of the aluminum material inherent in the draw and iron process after the tube yoke leaves the draw and iron die. Also, prior to the draw and iron forming operation, the diameter of the tube seat of the net shape body 58 is slightly larger than the inside diameter $D_2$ of the draw and iron die so that the draw and iron die can effectively form and shape the aluminum material into the shape of the draw and iron die.

In general, the draw and iron process is well known to those skilled in the art. It can be seen that the draw and iron process forms the net shape body 58 into the final shape of the tube seat without using any machining steps. After the draw and iron process, the cross orifices 32 can be drilled and broached in the lug ears 30, in a manner known in the art. It is to be understood that the machining of the cross orifices in the lug ears can occur any time after the net shaped body is formed.

Figure 6:
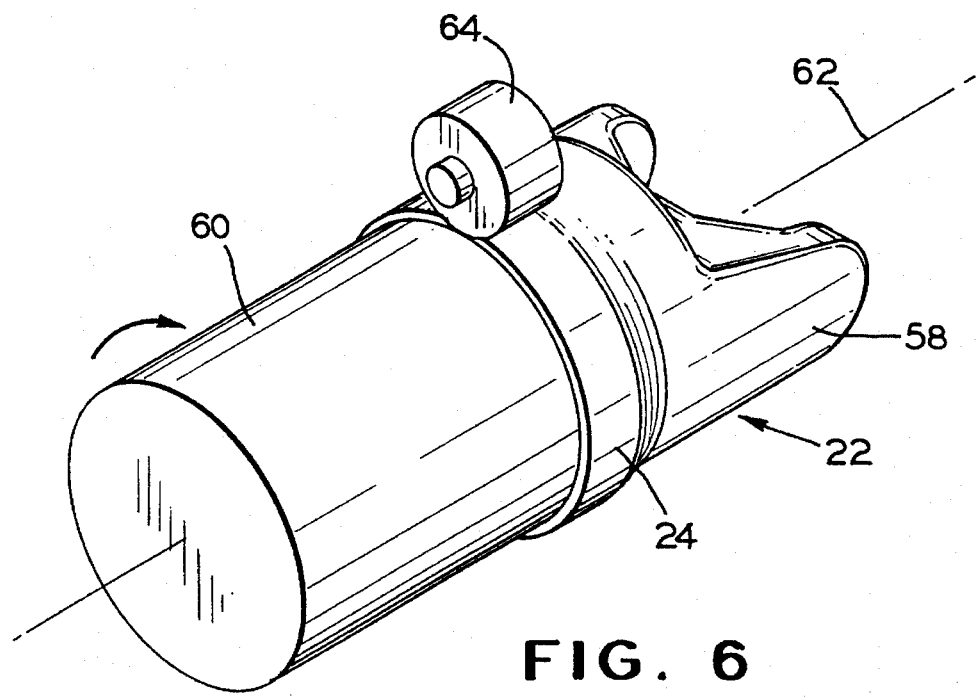
FIG. 6 is a schematic view of a forming operation using spinning to form the final shape of the tube yoke.

Another forming operation potentially useful with the method of the invention is a spinning method, shown in FIG. 6. The net shape body 58 is attached to a rotating interior mandrel 60 which rotates about longitudinal axis 62. A spinning wheel, such as wheel 64, is mounted for rotation in a manner which presses the material in the tube seat inwardly to form the material into the desired dimensions. Spinning operations are well known in the art.

Figure 7:
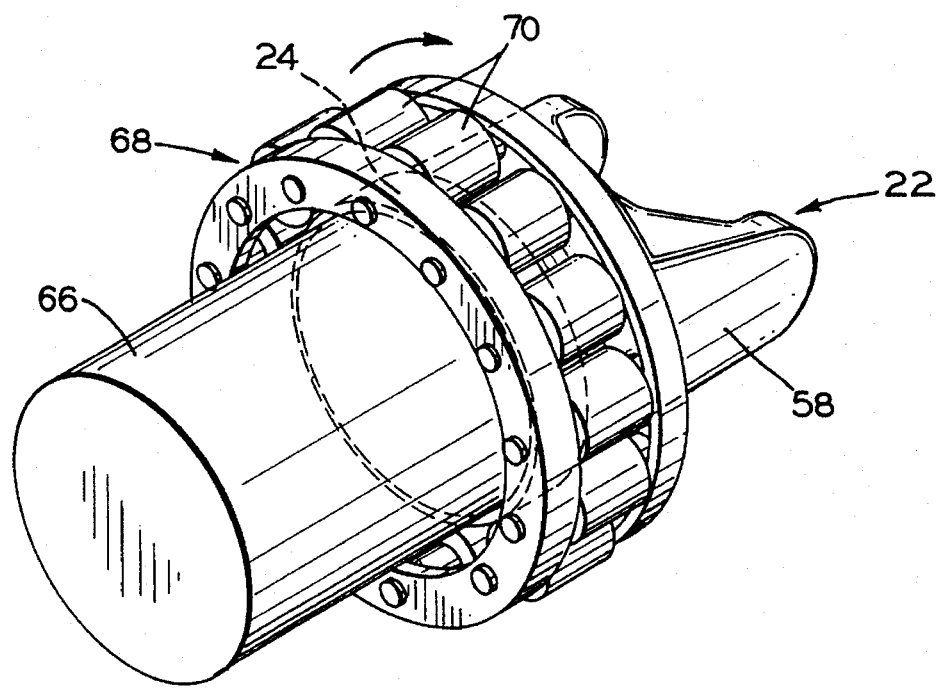
FIG. 7 is a schematic view of a forming operation using burnishing to form the final shape of the tube yoke.

An additional forming operation which can be used with the invention is a burnishing operation, shown in FIG. 7. The net shape body 58 is attached to a stationary mandrel 66, and a rotating burnishing fixture 68 is mounted for rotation about the tube seat 24 of the tube yoke 22. The burnishing fixture is adapted with numerous rollers 70 Which press the material in the tube seat inwardly to form the material into the desired dimensions. It can be seen that both the spinning and the burnishing forming operations are process steps which form the tube seat of the net shape body 58 into its final pre-assembly form and shape without requiring any machining.

When an aluminum alloy is used, the alloy typically has a temper of T-4 after the forging operation. The alloy is preferably aged to a temper of T-6 after the forging operation, and most preferably prior to the final forming step. As is well known to one skilled in the art, the aging can be accomplished by raising the temperature of the aluminum alloy for a predetermined time.

In the preferred operation of the invention, the method of making a tube yoke 22 for a drive line assembly 15 begins with the forging of the aluminum plug 50 into a net shape body 58 of the tube yoke with a single die-punching stroke. The net shape body 58 is a unitary element and has a tube seat 24 at one end for mating with the driveshaft tube 16, and lug ears 30 at the other end for connecting with the universal joint assembly 18. The net shape body is aged to a temper of T-6. The net shape body 58 is then subjected to a draw and iron operation to form the net shape body into the final shape of the tube yoke, having a tube seat at one end and lug ears at the other end, with the tube seat being in its final pre-assembly form and shape. The lug ears are machined to enable connection with the universal joint assembly.

It will be evident from the foregoing that various modifications can be made to this invention. Such, however are considered as being within the scope of the invention.

What is claimed is:

1. A method of making a tube yoke for a drive line assembly, the tube yoke having a tube seat at one end for mating with a driveshaft tube and lug ears at the other end for connecting with a universal joint assembly, the method comprising the steps of:

(a) forming a body of metal into a net shape body of the tube yoke having a tube seat at one end and lug ears at the other end;

(b) subsequent to said step (a), subjecting the net shape body to a forming operation to form the tube seat into its final pre-assembly form and shape without machining of the tube seat and machining the lug ears to enable connection with the universal joint assembly; and (c) subsequent to said step (b), securing the tube seat of the tube yoke to the driveshaft tube to form the drive line assembly.

2. The method of claim 1 in which the step of forming the body of metal into a net shape body is done by forging.

3. The method of claim 2 in which the step of forming the body of metal into a net shape body is done by forging with a single die-punching stroke.

4. The method of claim 2 comprising subjecting the net shape body to a draw and iron operation to form the tube seat into its final pre-assembly form and shape.

5. The method of claim 4 in which the step of forming the body of metal into a net shape body is done by forging with a single die-punching stroke.

6. The method of claim 1 in which the step of forming the body of metal into a net shape body is done by casting.

7. The method of claim 1 in which the metal is aged to a T-6 temper.

8. The method of claim 1 comprising aging the metal in the net shape body to a T-6 temper prior to forming the tube seat into its final pre-assembly form and shape.

9. The method of claim 1 comprising subjecting the net shape body to a draw and iron operation to form the tube seat into its final pre-assembly form and shape.

10. The method of claim 1 in which the tube yoke is a unitary element.

11. The method of claim 1 comprising subjecting the net shape body to a spinning operation to form the tube seat into its final pre-assembly form and shape.

12. The method of claim 1 comprising subjecting the net shape body to a burnishing operation to form the tube seat into its final pre-assembly form and shape.

13. A method of making a tube yoke for a drive line assembly, the tube yoke being a unitary element and having a tube seat at one end for mating with a driveshaft tube and lug ears at the other end for connecting with a universal joint assembly, the method comprising the steps of:

(a) forging a body of metal into a net shape body of the tube yoke having a tube seat at one end and lug ears at the other end;

(b) subsequent to said step (a), subjecting the net shape body to a forming operation to form the tube seat into its final pre-assembly form and shape without machining of the tube seat, and machining the lug ears to enable connection with the universal joint assembly; and (c) subsequent to said step (b), securing the tube seat of the tube yoke to the driveshaft tube to form the drive line assembly.

14. The method of claim 13 in which the forging step comprises forming the body of metal into the net shape body with a single die-punching stroke.

15. The method of claim 14 in which the metal is aged to a T-6 temper.

16. The method of claim 15 comprising aging the metal in the net shape body to a T-6 temper prior to forming the tube seat into its final pre-assembly form and shape.

17. The method of claim 16 comprising subjecting the net shape body to a draw and iron operation to form the tube seat into its final pre-assembly form and shape.

18. The method of claim 16 comprising subjecting the net shape body to a spinning operation to form the tube seat into its final pre-assembly form and shape.

19. The method of claim 16 comprising subjecting the net shape body to a burnishing operation to form the tube seat into its final pre-assembly form and shape.

20. A method of making a tube yoke for a drive line assembly, the tube yoke being a unitary element and having a tube seat at one end for mating with a driveshaft tube and lug ears at the other end for connecting with a universal joint assembly, the method comprising the steps of:

(a) forging a body of metal into a net shape body of the tube yoke with a single die-punching stroke, the net shape body having a tube seat at one end and lug ears at the other end;

(b) subsequent to said step (a) aging the net shape body to a T-6 temper, subjecting the net shape body to a draw and iron operation to form the tube seat into its final pre-assembly form and shape, and machining the lug ears to enable connection with the universal joint assembly; and (c) subsequent to said step (b), securing the tube seat of the tube yoke to the driveshaft tube to form the drive line assembly.

* * * * *